US006584769B1

(12) United States Patent
Bruun

(10) Patent No.: US 6,584,769 B1
(45) Date of Patent: Jul. 1, 2003

(54) MOBILE WORKING MACHINE

(76) Inventor: Lars Bruun, Piludden, SE-682 34 Filipstad (SE)

( * ) Notice: Subject to any disclaimer, the term of this patent is extended or adjusted under 35 U.S.C. 154(b) by 0 days.

(21) Appl. No.: 09/719,860

(22) PCT Filed: Jun. 23, 1999

(86) PCT No.: PCT/SE99/01131

§ 371 (c)(1), (2), (4) Date: Dec. 18, 2000

(87) PCT Pub. No.: WO00/00748

PCT Pub. Date: Jan. 6, 2000

(30) Foreign Application Priority Data

Jun. 27, 1998 (SE) .............................................. 9802323
Aug. 25, 1998 (SE) .............................................. 9802869
Mar. 31, 1999 (SE) .............................................. 9901176

(51) Int. Cl.[7] ................................................ F16D 31/02
(52) U.S. Cl. .............................. 60/414; 60/416; 60/419
(58) Field of Search ........................... 60/414, 416, 419

(56) References Cited

U.S. PATENT DOCUMENTS 4,541,241 A 9/1985 Schulze
4,646,518 A 3/1987 Hochsattel
4,674,280 A * 6/1987 Stuhr .......................... 60/416
4,715,180 A * 12/1987 Rosman ....................... 60/414
4,761,954 A * 8/1988 Rosman ....................... 60/416
4,928,487 A 5/1990 Nikolaus ..................... 60/414
5,579,868 A * 12/1996 Pelto-Huikko ............... 60/414
6,116,138 A * 9/2000 Achten ........................ 60/419

FOREIGN PATENT DOCUMENTS

DE 19721759 11/1998
SE 455864 8/1988
WO WO 9613669 5/1996

* cited by examiner

*Primary Examiner*—F. Daniel Lopez
(74) *Attorney, Agent, or Firm*—Michael D. Bednarek; Shaw Pittman LLP

(57) ABSTRACT

A hydraulic circuit for a mobile handling device includes a lifting cylinder suitable for handling a variable load and an accumulator for recovering or recycling lowering load energy. The hydraulic circuit also includes a variable hydraulic machine, driven by a drive unit, capable of developing full system pressure in two flow directions, to either of two ports. One of the two ports is connected to the accumulator, by a first connecting line, and the other is connected to the lifting cylinder, by a second connecting line. A second accumulator is connected to the first and second connecting lines by a check valve.

12 Claims, 5 Drawing Sheets

MOBILE WORKING MACHINE

TECHNICAL FIELD

Mobile handling device with hydraulic circuit, which hydraulic circuit comprises a lifting. cylinder arranged in a lifting device intended for handling a variable load and an accumulator for recovering or recycling the lowering load energy.

PRIOR ART

Excavators, trucks, container handlers etc. and a large number of other mobile handling machines which are intended to handle a variable load have one or more lifting cylinders for lifting the load for which the unit is designed. The great majority of mobile handling devices used today have no energy recovery facility whatever for the lowering load, meaning that the lowering load energy, most often in connection with passage through a control valve which determines the lifting and lowering motion, is converted to heat which then has to be cooled away. The heating of the hydraulic oil to undesirable temperatures is a long familiar problem for machinery manufacturers and end customers.

As well as eliminating the heat problem, there is naturally a constant desire to be able to minimize the energy requirement when operating a mobile handling device. For mobile handling devices, for example excavators, it normally holds good that arm systems and equipment have a dead weight which is dependent on the task to be executed. The lowering load energy can thus vary considerably under different conditions. There is for example a considerable difference in the tool weight of a machine equipped only for excavation and another machine which is equipped with a rotor tilt tool attachment for carrying out associated work. Many similar examples are generally known to the expert in the field, but in short it can be said that the dead weight of the arm system can vary from around 30% to 80% of the maximum lifting force. In addition to this, there is also a great difference in the kind of work the machine is intended to carry out, for example whether levelling or loading is involved. It is widely known that an excavator can execute up to five different work tasks perfectly well in some shifts. It is previously known in connection with mobile handling machines, for example by way of WO 9311363 and DE 4438899, to provide a hydraulic circuit with recovery in connection with lifting or lowering movements, an accumulator circuit being provided which utilizes the potential energy of the arm system and the load on lowering. These known systems are based on using at least two lifting cylinders connected to one another. This is obviously an undesirable restriction, since in many applications it is desirable to use just one lifting cylinder. Certain known embodiments according to the aforementioned prior art have also caused impaired visibility. Furthermore, this known solution also involves several moving parts and in certain cases causes uneven loading to occur. A common feature of these known systems is that the energy saving systems are suitable for lifting work in which a large part of the energy supplied goes on lifting the actual arm system, which makes them poorly adapted to mobile handling machines with considerably varying loads. A further disadvantage is that one is forced to work at very high pressures, often of up to 350 bar, which results in a considerable increase in the price of small effective volumes in relation to the size. In addition, commonly known systems give rise to certain control problems which are difficult to solve. These known systems do not therefore solve the problems in an optimal manner. A first object according to the invention is therefore to solve this problems in a more optimal manner.

A specific problem in the field of the invention relates to mobile handling machines which also equipped with a slewing motion for the lifting device, of the excavator type, which are equipped with a roller path and one or more hydraulic motors which transmit the force for the slewing motion by means of toothed gearing. Such machines have a slewing part, which in relation to the load represents a large mass, signifying a large moment of inertia which has to be overcome at each new start of a slewing motion. This makes great demands if speed is desired in the slewing motion, and it is not unusual for more than 40% of the motor power to be used for starting this. During the acceleration phase, the pressure will rise to the maximum value and the flow increases until its desired rotation speed is attained, following which the pressure is reduced to the level required for overcoming the no-load losses. During the deceleration phase, the movement energy attained is then braked away in machines of this kind by throttling the return flow via overflow valves, which in addition to an energy loss gives rise to not inconsiderable heating of the hydraulic medium.

In most hydraulic systems for the purpose, the system is also set up using a counter-pressure on the "meter in" side to prevent the movement racing away ahead of the "meter out" flow, i.e. to avoid so-called hydraulic play. This setting up will function in principle such that one both accelerates and brakes at the same time, which of course is very disadvantageous from the energy point of view. It is not unusual to brake away 30% of the power supplied in this manner during the stewing movement itself It is perceived that it would be advantageous if the movement energy from the slewing motion could be recovered, not least against the background of the problems already discussed above with regard to the increase in the oil temperature, which among other things has a negative effect on the life of the oil. Furthermore, it is perceived that it is a disadvantage to have to provide special auxiliary systems to ensure the requisite filling with hydraulic oil in a closed accumulator circuit system according to the prior art.

SOLUTION AND ADVANTAGES

The object of the present invention is to eliminate or at least reduce the aforementioned problems, which is achieved by means of the fact that the hydraulic circuit comprises a variable hydraulic machine with two ports, which hydraulic machine is capable via a drive unit of giving off full system pressure in two flow directions to said ports, one port being connected to an accumulator and the other port being connected to a lifting cylinder.

Thanks to the use of this type of hydraulic machine in the hydraulic circuit, the oil can be pumped directly between the accumulator and the lifting cylinder, which signifies a considerable simplification and means that control losses are eliminated in effect. The invention thus not only solves the heat problem, but also signifies a substantial energy saving, which surprisingly has been shown to amount to around 30%.

It is true that a hydraulic circuit is previously known from U.S. Pat. No. 4,646,518 which comprises a variable reciprocating pump which acts together with an accumulator. This known system, however, concerns a quite specifically distinct device, namely a feed pump for crude oil, which is a stationary installation of considerable dimensions. Thus it does not relate to a mobile device or recovery of lowering load energy from a lifting device with a variable load, but only continuous recovery of the constant load which the oil pump itself brings about. The known system thus relates to a field quite specifically distinct from the present invention, which refers to mobile handling devices in which the variable load in itself represents the most important source for the recovery of energy and in which the variable load in itself is the cause of the problem of overheating of the hydraulic medium according to the prior art.

According to a further aspect according to the invention, it holds good that in communication with said hydraulic circuit is a control valve, said variable reciprocating pump being connected to at least one of said accumulator and said lifting cylinder without the connection going via the control valve, preferably both said accumulator and said lifting cylinder being connected in such a way to the reciprocating pump. A system of this kind signifies a considerable simplification, not least in control terms, and means that control losses are in effect eliminated. In addition it is the case that the control valves in existence today are not normally made to control the flow from the consumer unit to the motor port, but are designed to control the flow from the motor port to the consumer unit. This is a disadvantage from the operator viewpoint, as no pressure compensation can take place, which means that the lifting speed is influenced by the load. A system according to the invention can eliminate all these disadvantages and is also more efficient.

According to a further aspect according to the invention, the hydraulic circuit comprises a first stop valve disposed in the line between one port of the hydraulic machine and the lifting cylinder, and a second stop valve disposed in the line between the second port of the hydraulic machine and the accumulator, meaning that leakage losses, which would otherwise occur in the hydraulic machine, can be eliminated during periods when the hydraulic machine is in the neutral position, i.e. when the lifting device is not intended to execute work in a vertical direction.

According to a further aspect according to the invention, it is the case that said first and second stop valves are controlled by a servo circuit which comprises a servo pump and a valve unit, by means of which the stop valves are actuated into the open position when a control signal activates the changeover valve to open the connection between the accumulator and the lifting cylinder via the hydraulic machine. The advantage is hereby gained that the stop valves are controlled in an energy-efficient manner to open or close in an optimum manner for the system by means of control signals from an operator or an automated monitoring system.

According to a further aspect according to the invention, it is the case that said cylinder is of the double-acting type comprising a rod side and a cylinder side, the side which is not directly connected to the hydraulic machine being able to receive oil from a hydraulic pump via a control regulator. The advantage is hereby obtained that the handling device's traditional hydraulic system can be used to supplement regulation of the lowering movement of the lifting device, especially when the variable lowering load is too low to be able to make a positive contribution to the lifting circuit.

According to a further aspect according to the invention, it is the case that the hydraulic circuit comprises a second accumulator, which is connected via at least one nonreturn valve to at least one of the lines between the accumulator and the hydraulic machine or the hydraulic machine and the lifting cylinder. The risk is hereby eliminated of the hydraulic machine "running dry", i.e. operating without a supply of hydraulic oil. This is namely an evident risk in a system according to the invention, since the oil which is located in the main accumulator is a limited quantity and the flow emitted from the accumulator is terminated instantaneously when this is emptied. As soon as such a hydraulic machine "runs dry", there is a risk that it will seize. This can happen in the course of fractions of seconds. It is thus important that oil can be supplied directly from another part of the system. Normally, the usual hydraulic pump of the handling device will not suffice here, as it usually requires a short start-up period to be able to deliver an adequate oil flow. Thus it is necessary in certain systems according to the invention to provide a second accumulator, which communicates directly via nonreturn valves with the circuit with the hydraulic machine, in order that oil can be supplied instantaneously with the aim of eliminating the risk of damage.

According to further aspects relating to a hydraulic circuit according to the last-named type, comprising a second accumulator, the following holds good:

- that said second accumulator is connected via at least one, and preferably two, nonreturn valves to both the line between the accumulator and the motor and the line between the motor and the lifting cylinder.
- that the system pressure in said second accumulator is considerably lower than in said first accumulator.

According to a specific aspect according to the invention, it is the case that the hydraulic circuit with the lifting cylinder and the accumulator communicates with a second hydraulic circuit for a slewing turning device, which second circuit comprises valve elements which in connection with deceleration of said stewing part supplies hydraulic fluid to said accumulator, whereupon this is filled and at the same time acts on the slewing part with a decelerating force. Thanks to this solution, a large part of the braking energy from the slewing movement can thus be recovered in the system. In addition, it offers the advantage that the additional energy often appears at an optimum stage, i.e. when the accumulator is on the point of being emptied, as the stewing motion is often operated at the same time as lifting and since the slewing motion is often terminated before the lifting motion is completed. This additional energy thus often comes to the accumulator at precisely the right moment, i.e. when the accumulator is almost empty, providing renewed accumulator power so that the lifting motion can be completed by means of oil which is supplied via the accumulator.

Further aspects and advantages according to the invention will be evident from the more detailed description below.

DESCRIPTION OF DRAWINGS

The invention will be described below in greater detail in connection with the enclosed drawings, in which.

DETAILED DESCRIPTION

Figure 1:
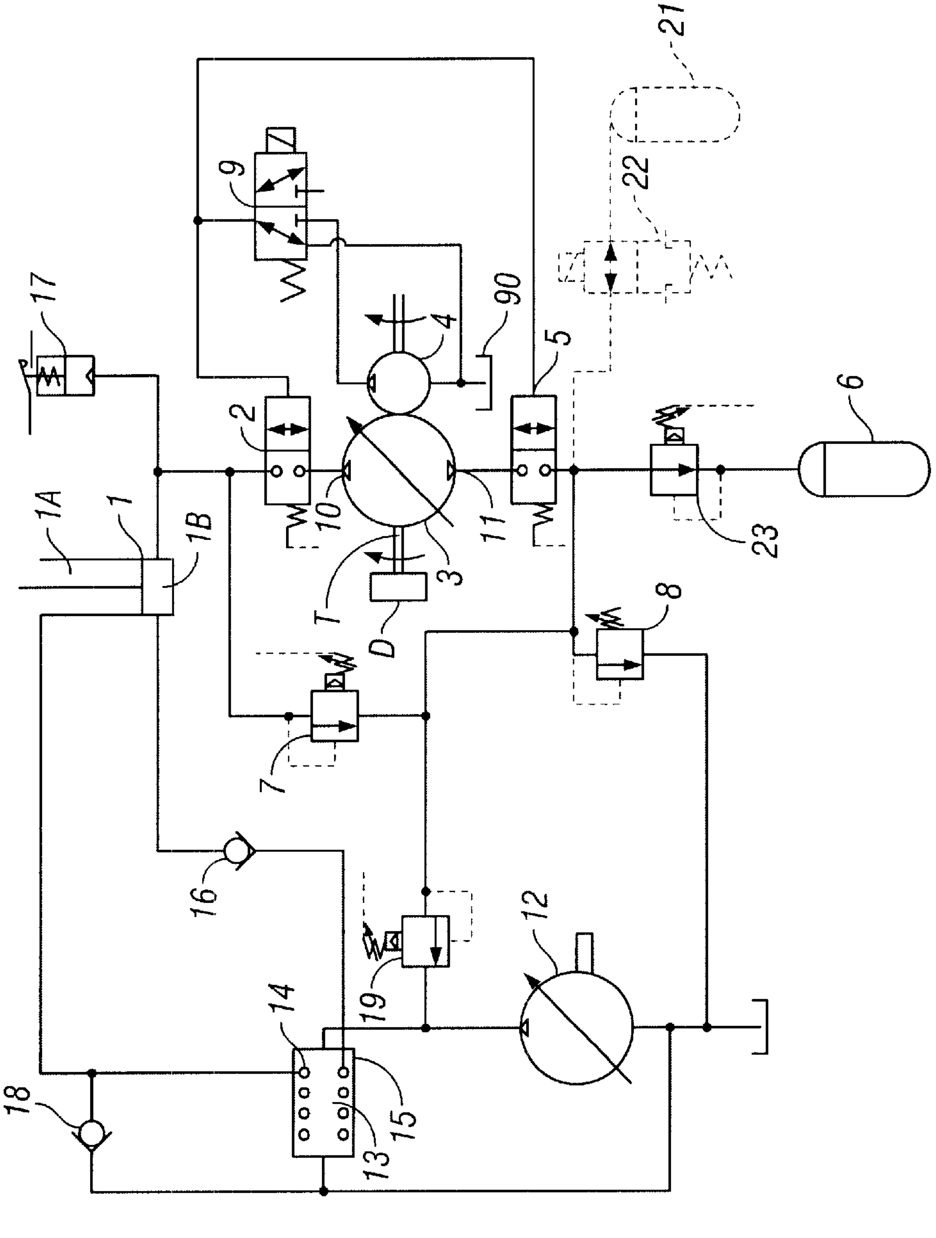
FIG. 1 shows a hydraulic scheme for a lifting cylinder in a hydraulic circuit according to the invention.

FIG. 1 shows a hydraulic scheme for a lifting cylinder in a hydraulic circuit according to the invention. A double-acting hydraulic cylinder 1, variable reciprocating pump 3 (which is called a hydraulic machine below) and an accumulator 6 are shown. The hydraulic circuit is disposed in a mobile handling device, for example a truck or excavator, the lifting cylinder 1 thus being provided to carry out vertical work in the handling device's lifting device, for example the arm which carries the bucket on an excavator. Disposed between the lifting cylinder 1 and the hydraulic machine 3 is a logic element 2, in the form of a stop valve, which is spring-loaded and which in its uninfluenced state breaks the connection between the hydraulic machine 3 and the lifting cylinder 1. In its activated position, the valve device 2 gives open communication between the hydraulic machine 3 and the lifting cylinder 1. This logic element 2 also preferably functions as a tube-breaking element. A similar logic element 5 is disposed between the accumulator 6 and the hydraulic motor 3, with a function similar to the first-named logic element 2. This too is in the form of a stop valve 2. Both these valve devices 2, 5 are controlled by means of a servo system 4, 9, consisting of a servo pump 4 and a valve 9. The servo pump 4 is operated by an independent source, normally the handling device's fuel-based motor D, which appropriately also drives the variable reciprocating pump 3. Operation takes place in a known manner via a suitable transmission. The hydraulic flow from the servo pump 4 can act via the valve 9 on the logic elements 2, 5 to open the connection in the respective line 3-1, 3-6. The servo valve 9 is normally controlled by an operator, if applicable by an automatic monitoring system, in such a manner that when it is desired to carry out work with the lifting cylinder 1, the servo valve 9 is actuated to open the connection between the pressure side of the servo pump 4 and the lines 9-2, 9-5, which lead to the logic elements 2, 5, so that the oil pressure is supplied when these open. As soon as actuation of the servo valve 9 ceases (this resumes a non-acting position for example by means of spring force), no signal is emitted to the logic elements 2, 5, so that the pressure side of the servo pump 4 is cut off from connection to the lines 9-2, 9-5, the lines 9-2, 9-5 instead being connected to a return line 9-90, which leads to an unpressurized tank 90. By means of this servo circuit 4, 9, it is thus ensured that an open connection always exists when there is a need for a lifting or lowering motion, at the same time as the valves eliminate unnecessary leakage through the hydraulic motor 3. Of course, a variable hydraulic machine (sometimes also called the hydraulic motor) always has a certain leakage. Thus it is desirable to shut off the connection to pressurized parts when the system is in the neutral position to eliminate unnecessary leakage.

The hydraulic machine 3 is a variable reciprocating pump which can both receive and emit oil at the ports 10, 11. The pump is of a known type which permits full system pressure at both outlet ports and in which the flow can be adjusted from 0–max. by means of the variable setting, which is normally achieved by means of a so-called swash plate. Using a pump of this kind eliminates the need to regulate the circuit via a control valve, whereby a considerable simplification is achieved at the same time as control losses are practically eliminated.

Furthermore, a sequential valve 7 is included in the hydraulic circuit. The sequential valve 7 is disposed in a line 1-6, which connects the lifting cylinder 1 to the accumulator 6, by means of which it is possible to relieve any excess pressure in the line 1-2 between the lifting cylinder and the logic element 2 via the sequential valve 7 to the accumulator 6, so that the energy is retained in the system.

A safety valve 8 is provided in the system between the accumulator 6 and a tank 42, which ensures that a certain maximum pressure for the circuit is not exceeded. A pressure-reducing valve 23 is disposed between the accumulator 6 and the logic element 5. The pressure-reducing valve ensures that the accumulator pressure does not exceed the maximum value permitted for the accumulator type, meaning that the accumulator does not necessarily need to be of the same pressure class as the rest of the system.

Furthermore, it is shown that the hydraulic circuit is connected to the handling device's conventional hydraulic pump 12, the flow of which is regulated in a conventional manner via a control valve 13. Due to this, oil can be routed via one of the ports 14 on the control valve 13 to the opposite side 1 A of the double-acting cylinder 1. Furthermore, oil can be supplied via the control valve 13 via a second port 15 to the piston side 1 B of the lifting cylinder 1. In the line 15-1, disposed between the control valve 13 and the piston side 1 B of the lifting cylinder 1 is a nonreturn valve 16 which prevents oil being routed from the piston side 1 B of the lifting cylinder to the control valve 13. The hydraulic pump 12 collects its oil in the normal manner from the tank 42. The control valve 13 is normally connected by one end 13-42 to the tank 42, while its other end 13-12 is connected to the hydraulic pump 12. Furthermore, the system has a sequential valve 19 which can return surplus oil from the lifting circuit 1, 3, 6 to the control valve 13, where it can be used for example to manoeuvre the stick on an excavator. Finally, it is shown that the system can include a further accumulator 21, which can either be disposed to be connected or not connected to the circuit via a valve 22. This extra accumulator 21 can be used either to ensure that sufficient hydraulic oil is to be found in connection with certain working operations and/or to provide the circuit with a different pressure level in connection with certain working operations.

A pressure-sensing element 17 is provided to be able to register the pressure in the line between the lifting cylinder 1 and the logic element 2. In the event of a lowering motion which requires power, the pressure-sensing element 17 will register that the pressure is below that required for the function and ensure that the control valve 13 emits oil to the rod side of the lifting cylinder via port 14.

The system functions such that in the event of a lifting movement, the operator will send a control signal to the control servo (not shown), which will activate the valve 9 which in turn ensures that the valves 2 and 5 open. The connection between the accumulator 6, hydraulic machine 3 and lifting cylinder 1 is thus completely open. The pressurized oil in the accumulator 6 flows then to the variable hydraulic machine 3, which conveys the oil onwards to the lifting cylinder 1. If the pressure in the accumulator in this case is higher than that required to carry out the work using the lifting cylinder 1, the surplus energy will be supplied by the hydraulic machine 3 to the drive system, best achieved via the transmission T. If the accumulator pressure should not be quite sufficient, the variable hydraulic machine 3 provides a pressure increase to reach the requisite pressure level, which is achieved by means of power which is supplied via the handling machine's motor D. Thus in such a situation only as much energy is supplied as is required to overcome the pressure difference between the accumulator and the lifting cylinder's requirement.

In the event of a lowering movement, the direction of flow in the pump is changed and oil is supplied at port 10 and emitted at port 11 to be supplied to the accumulator 6. If the pressure in the accumulator 6 is then lower than at the lifting cylinder 1, the variable hydraulic machine 3 will be able to supply energy to the transmission T. If on the other hand the pressure in the accumulator is higher than in the lifting cylinder, additional energy from the motor D will need to be supplied to the variable hydraulic machine 3 to obtain a lowering movement. However, this energy supplied is stored in the accumulator 6 and is therefore accessible in connection with the next lifting movement. It is evident from the above that the system is energy-saving and eliminates heat-generating throttling of the oil flow which normally occurs when the lowering energy is handled in conventional systems.

The task of the pressure-sensing element 17 is to ensure that the hydraulic machine 3 adjusts the flow down to 0 when the hydraulic cylinder no longer has any pressure, for example when the bucket has reached ground level.

In the case of a lifting motion which it is desired to execute quickly, a normal requirement for example in deep cut digging, both the variable hydraulic machine 3 and the hydraulic pump 12 can be activated, in which case the oil obtained from the accumulator does not fully correspond to the quantity of oil of the lifting cylinder. During a lowering movement, the nonreturn valve 16 will prevent the oil from flowing to port 15. On the next lowering movement, therefore, an amount corresponding to that obtained from the pump 12 must be evacuated from the circuit through the safety valve 8. Alternatively, the sequential valve 19 can be used to return the surplus oil to the inlet side of the control valve 13, to be used for example for the slewing motion on an excavator. Oil for the rod side of the double-acting lifting cylinder 1 can be obtained via a so-called refill valve 18, in the form of a nonreturn valve, which is disposed between the outlet side of the control valve and the line 14-1 which leads to the rod side of the lifting cylinder 1.

Figure 2:
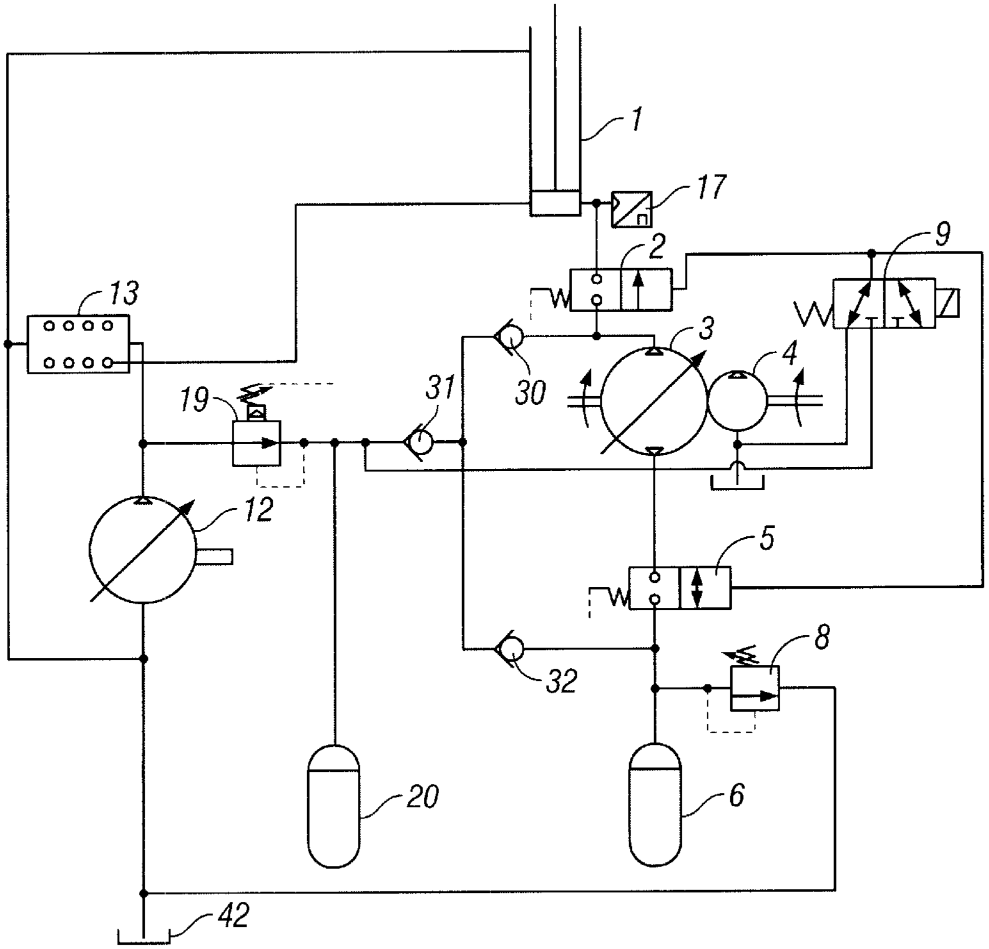
FIG. 2 shows a preferred hydraulic scheme for a lifting cylinder in a closed system according to the invention.

FIG. 2 shows a preferred hydraulic scheme for a hydraulic circuit according to the invention. This shows a hydraulic circuit which in total consists basically of the same subcomponents as described in FIG. 1. Only the essential differences will therefore be described below. It is shown that a further accumulator 20 is provided connected to the circuit. This further accumulator 20 has a lower system pressure than the main accumulator 6. The second accumulator 20 is connected to the main system 6, 3, 1 via nonreturn valves 30, 31, 32. A first line 2-20 is connected to the line between the logic element 2 and the top port 10 of the hydraulic machine 3 via a first nonreturn valve 30. A second line 5-20 is connected to the line between the accumulator 6 and the logic element 5 via a second nonreturn valve 32. The two lines are brought together to the opening side of a common nonreturn valve 31 which is connected via its closing side to the accumulator 20. The task of this additional accumulator 20 is to be able to supply oil instantaneously to the variable reciprocating pump 3 when urgently required. An urgent requirement of this kind arises when the main accumulator 6 becomes empty. Emptying of the main accumulator 6 takes place namely instantaneously in the course of a very short space of time without any actual advance warning that the quantity of oil is about to run out. The conventional hydraulic pump 12 does not manage in this case to deliver oil in the short time which is available, meaning that a risk of total destruction of the variable reciprocating pump exists. This risk of destruction is thus eliminated by means of the extra accumulator 20 which can supply oil directly to the circuit 6, 3, 1 via the nonreturn valves when the system pressure drops rapidly. Furthermore, it is shown that a pressure monitoring element 17 is disposed connected to the lifting cylinder, with the same function as according to FIG. 1. The safety valve 8 ensures that the permitted system pressure for the accumulator 6 is not exceeded. The system otherwise functions as described in connection with FIG. 1.

Figure 3:
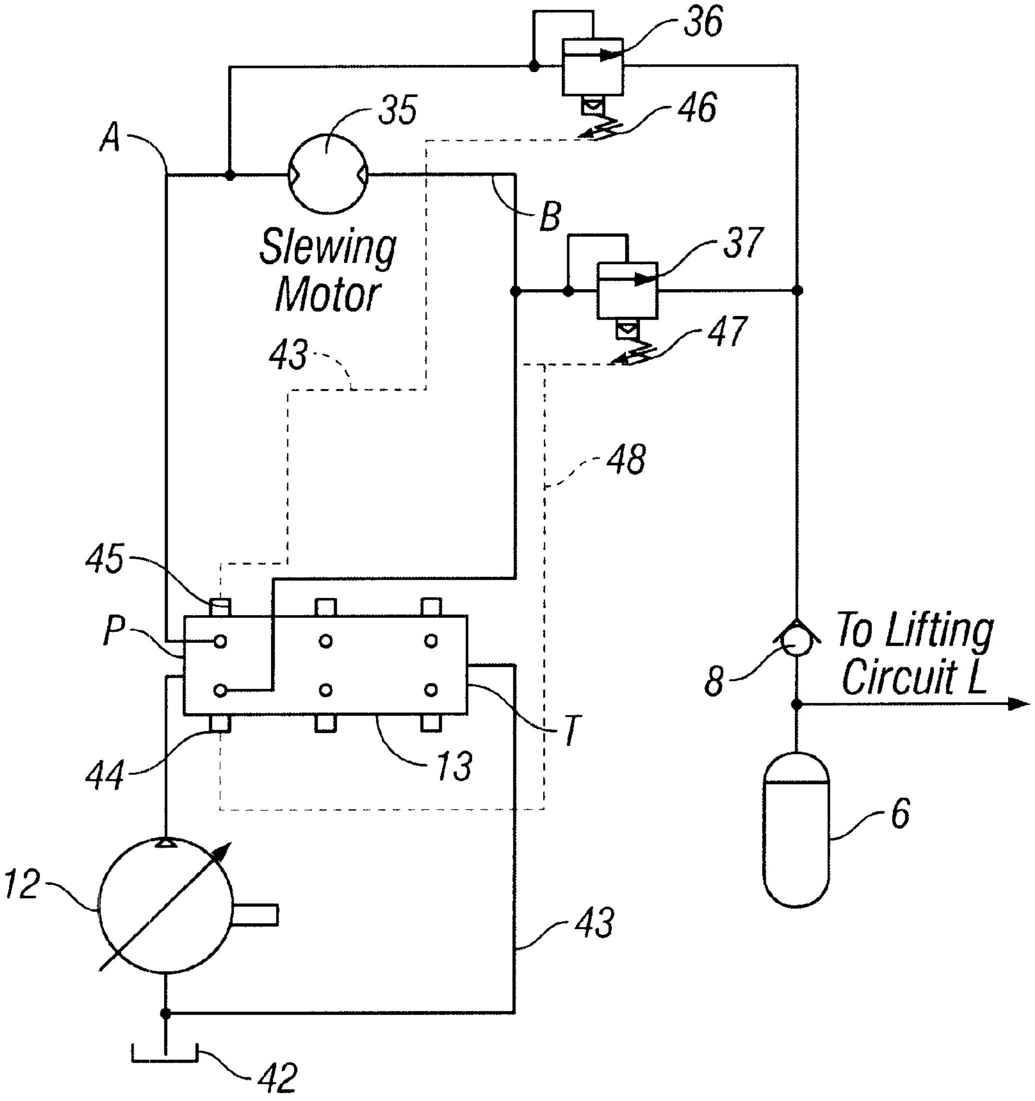
FIG. 3 shows a hydraulic scheme for a slewing circuit according to the invention.

FIG. 3 shows in diagrammatic form a hydraulic circuit for a handling machine (not shown) which has a slewing crane or the like (not shown), the slewing motions of which are activated by means of a hydraulic slewing motor 35. Also connected to the hydraulic circuit communicatingly for activating slewing of the arm is a lifting circuit L. Provided for this lifting circuit in a known manner is an accumulator 6 which is thus intended to utilize the potential energy of the arm system and the load on lowering. In the slewing circuit, which consists of the pump 12, control regulator 13, slewing motor 35, are two sequential valves 36, 37, which via a nonreturn valve 38 feed the surplus oil occurring on deceleration to the accumulator 6 located in the lifting circuit L.

The sequential valves 36, 37 are set by means of springs 46, 47, which means that a certain minimum pressure must exist in the forward line to the valve 36, 37 for this to be activated so that oil can pass to the accumulator tank 6. In addition, each sequential valve 36, 37 is connected via the line 43, 48 to a respective servo cover 44, 45 on the control regulator 13, which means that existing pressure in the servo cover 44, 45 is superimposed, together with the spring pressure at the sequential valve 36, 37. Located in the control regulator 13 in a known manner are pressure-reducing valves/overflow valves (not shown), which can be adjusted from being completely open to completely closed. The pump 12 feeds oil to one side P of the control regulator 13. On the opposite side of the control regulator, T, there is a return line 43 which is not pressurized and leads to the tank 42. Three other functions are provided in the case of the control regulator shown in FIG. 3. Each of these functions is controlled in a known manner by means of a slide valve. The figure only shows the circuit which is connected to the slide valve which actuates the slewing motor 35. Thus a top port is shown, the so-called A port, which provides slewing in one direction, and a lower port, the so-called B port, which provides slewing in another direction.

In a slewing motion, the control valve is activated by a servo (not shown) which causes oil to be sent from the pump 12 via the control regulator 13 to the slewing motor 35. If the control valve is activated so that the A port is opened, in that case the oil pressure from the pump 12 will be supplied on the one hand on the A-side to the slewing motor and also via the servo cover to the line 43 which effects the actuating pressure for the sequential valve 36. Thus the sequential valve 36 will thereby be kept closed during the acceleration phase, due to which all oil will be supplied and flow through the hydraulic motor 35. Due to the fact that at the same time the pressure-reducing valve which is disposed at the B port in the control regulator is fully open, the return oil will be able to pass without counter-pressure through the B port and out through the control regulator 13 to the return line 43 and then to the tank. The return circuit 45 is thus fully open to a tank 42 during the acceleration phase. When the desired speed of rotation has been attained, the pressure in the feed line of the motor 35 will drop until a state of equilibrium arises and only the pressure required for overcoming the losses occurs.

In a deceleration movement according to the prior art, the feed side, i.e. the A port, would now be closed and the outlet side, i.e. the B port, would be throttled, the majority of the deceleration work disappearing via the B port's pressure-reducing valve.

In a circuit according to the invention, the deceleration work will instead be utilized due to the fact that the braking energy is supplied to the accumulator tank 6. This is achieved by the pressurized hydraulic oil being supplied to the accumulator 6 via the sequential valve 37 or 36. Due to the fact that the pressure in the servo line 48 is reduced during the deceleration movement, the sequential valve 37 will open the connection to the accumulator 6 before the overflow valve has opened. Due to the fact that the accumulator pressure 6 is slightly below the deceleration pressure of the slewing motor 35, the deceleration energy will be supplied to the accumulator 6 practically intact. The energy loss is determined by the pressure difference between the two communicating levels. If a conventional system is used, in which one level is atmospheric pressure and e.g. the pressure level at the stewing circuit's pressure reducer is set at 210 bar, the flow×210 will equal the energy loss. In the application according to the invention, the only loss will be the difference between the accumulator pressure and the pressure level of the sequential valve. If the pressure in the accumulator for example is 160 bar and the lowest pressure in the sequential valve is 180 bar, the energy loss will be 20×flow, i.e. approx. 10% compared to a conventional arrangement. If the accumulator pressure during deceleration rises to 210, the loss will be close to zero. According to a preferred embodiment of the invention, the sequential valves 36, 37 are proportionally controlled inside the pressure level which the servo covers require or approx. 40 bar in excess of the basic setting of the sequential valve. This is achieved by reducing the pressure to the sequential valve in connection with the deceleration phase automatically when the control lever is released. The function of the nonreturn valve 38 is to prevent the accumulator from being emptied due to the not insignificant leakage which always exists in pilot-controlled valves. Due to the fact that the pressure in the servo cover 43, 44 is proportional to the desired slewing speed, the recovery effect will also be dependent on the mode of operation and the desired recovery can thereby be influenced by the operator's mode of operation.

A refilling circuit (not shown) is provided in the control regulator 13, the object of which circuit is to eliminate the occurrence of hydraulic play.

The system according to FIG. 3 offers several major advantages in addition to the energy-saving function, of which the most important is that heat generation is reduced drastically. All known overflow valves are based on the fact that the pressure of the hydraulic medium is reduced via throttling, the energy loss arising in this case being converted to heat. In the newly developed system, the pressure drop will in principle be virtually eliminated as the accumulator pressure differs negligibly from the maximum pressure of the stewing circuit, meaning that the heat increase is eliminated in principle. It is known from earlier that the temperature in the outlet of a pressure-reducing nozzle is directly dependent on the pressure difference. In a high pressure drop, 2–300 bar, which conventionally exists, the outlet temperature will be several hundred degrees, which has a negative effect on the life of the hydraulic medium. In reality it is almost only high temperatures which affect the oil life. With the ever-growing demands for environmental oils, which are sensitive to high temperatures, it is perceived that the advantages of the system are not inconsiderable. It is perceived that the system can be used to advantage in combination with hydraulic circuits other than just a lifting circuit, for example a hydraulic propulsion circuit.

Figure 4:
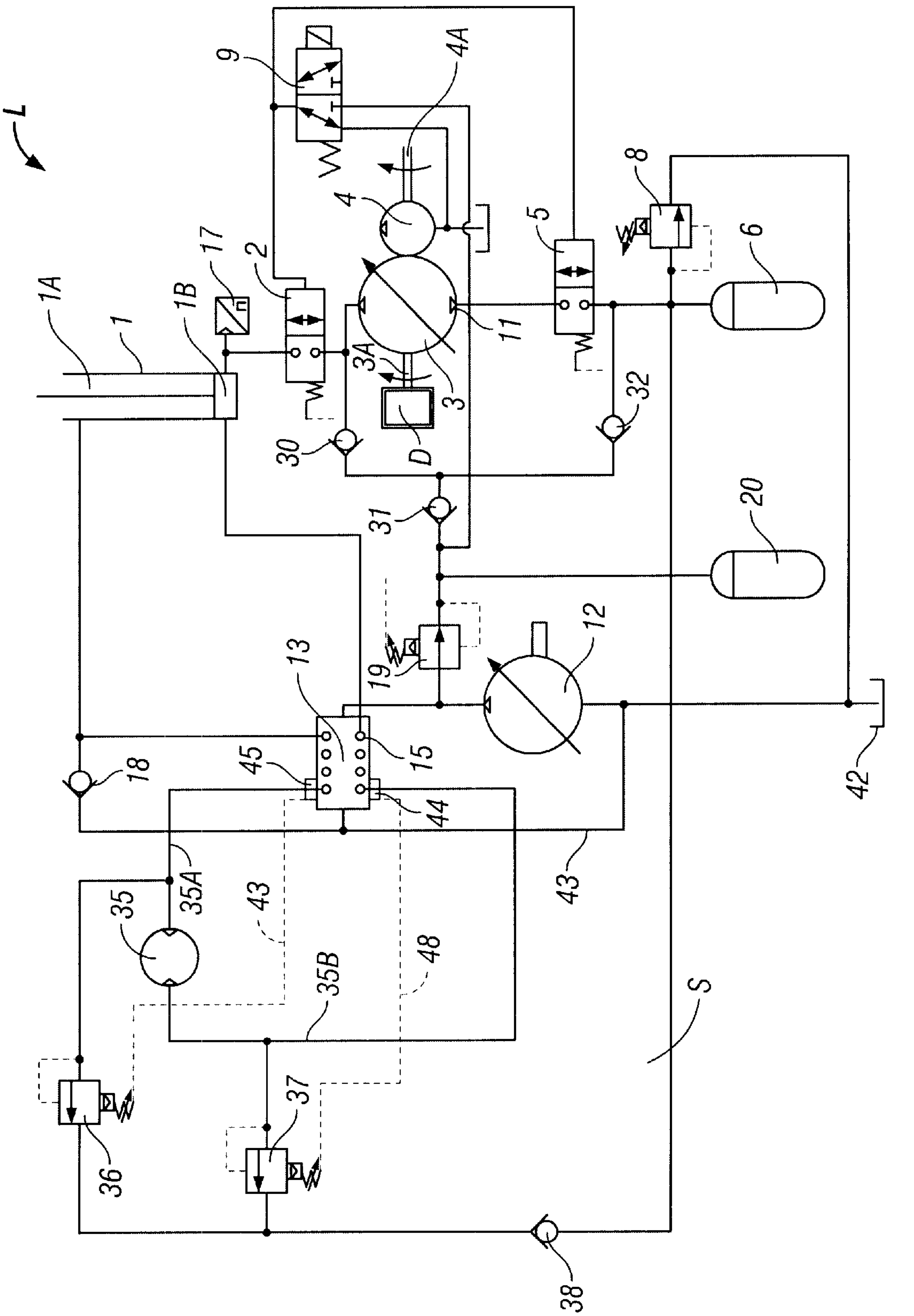
FIG. 4 shows a hydraulic scheme for a lifting cylinder and slewing circuit according to the invention and FIG. 5 shows a diagram which compares power consumption for a handling device according to the invention and a handling device according to the conventional art.

FIG. 4 shows a hydraulic scheme of a preferred combination of a slewing circuit 5 [sic] and a lifting circuit L forming part of an excavator, for example. The lifting cylinder 1 is connected in this case to the excavator bucket arm (not shown) and the slewing motor is connected to the excavator bucket's slewing circuit (not shown). As is evident, the preferred embodiment shown in FIG. 2 is used in the lifting circuit L, with an extra accumulator 20 to ensure the necessary oil flow to the variable hydraulic machine 3 even when the main accumulator 6 is emptied. It is also evident that the system in principle is a combination of FIGS. 2 and 3. Thus the line now leads from the slewing system S directly following the nonreturn valve 38 into the main accumulator 6. It is also shown that one and the same control regulator 13 is used to control the function both of the slewing motor 35 and any additional energy which needs to be supplied to the lifting cylinder 1. The system functions in principle entirely in accordance with what was described in the combined text with regard to FIGS. 2 and 3. Thanks to this solution, a large part of the braking energy from the stewing motion can thus be recovered in the system. Furthermore, it offers the advantage that the additional energy from the slewing circuit often occurs at an optimum stage, i.e. when the accumulator is about to be emptied, since the stewing motion is often operated at the same time as lifting, at least in connection with excavator buckets, and in this case the slewing motion is often decelerated before the lifting movement is completed. Often this additional energy thus comes to the accumulator at precisely the right moment, i.e. when the accumulator is almost empty, which provides renewed accumulator power so that the lifting movement can be completed by means of oil supplied via or in connection with the accumulator 6.

Figure 5:
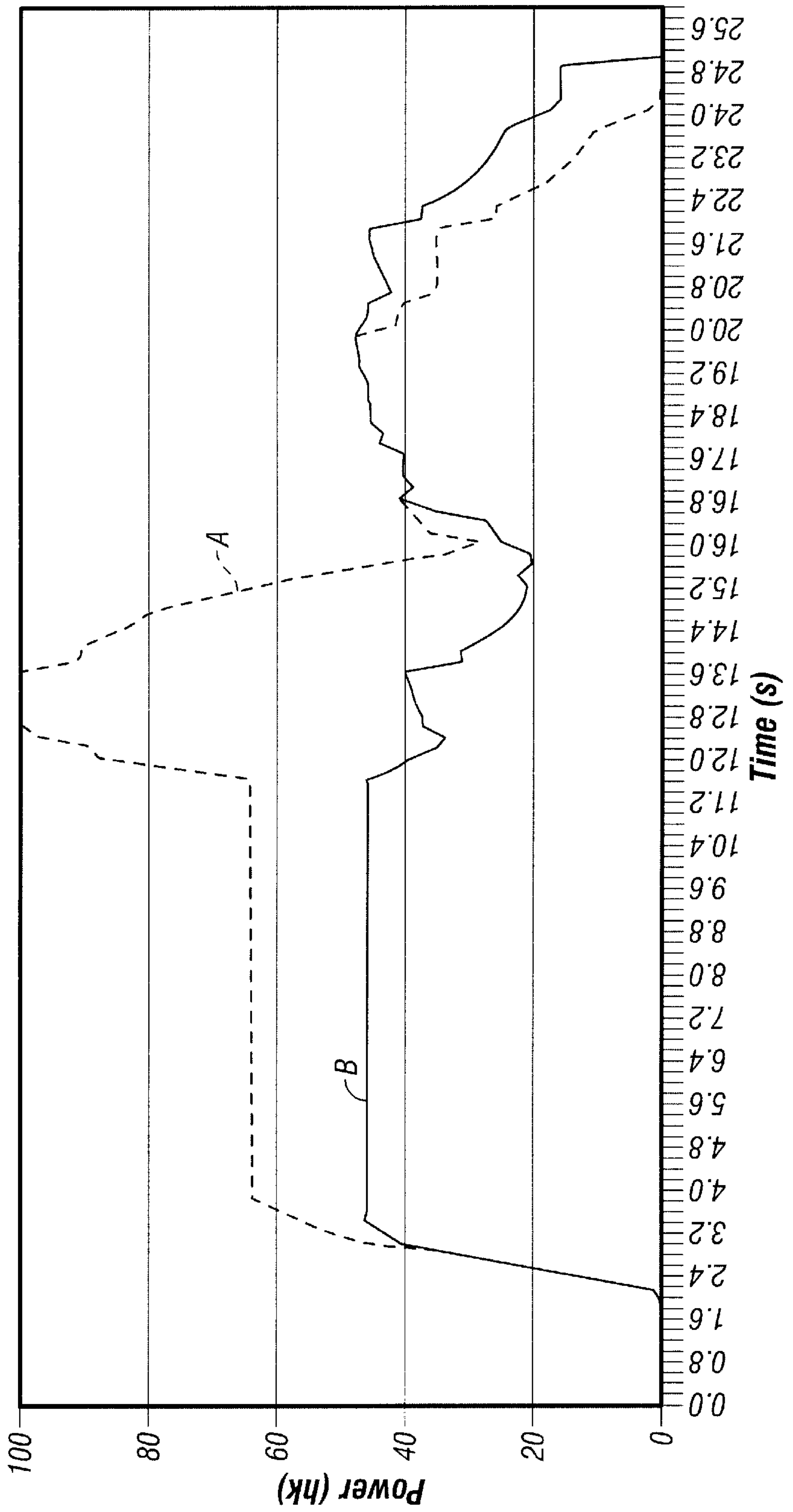

FIG. 5 shows in schematic form a diagram which illustrates an energy saving which can be achieved when using a lifting circuit according to the invention (i.e. according to FIG. 1 or 2). In the diagram, the momentary power consumption is shown on the y-axis and on the x-axis a time axis is shown. The curves simulate one and the same job carried out by an excavator, in which one curve A describes the power consumption in a standard system and the other curve B describes the power consumption with a system according to the invention. The simulation is based on a frequently occurring operation for excavator buckets involving first extending the bucket arm, then driving the bucket down into the ground, then contracting the arm, whereupon the bucket is filled, following which the bucket is lifted up and a slewing movement begun (power peak according to old system). Following this, the slewing movement is decelerated, the goods are dropped from the bucket, after which the bucket is finally lowered. It is obvious that the energy consumption is considerably greater for a standard system, approx. 40% during the most work-intensive phase (between two and sixteen seconds). A marked energy saving can thus be made thanks to the fact that oil at charging pressure from the accumulator can be reused. If the combination according to FIG. 4 is used in addition, the saving is even greater.

The invention is not restricted to that demonstrated above but can be varied within the scope of the following patent claims. It is perceived for example that the servo pressure can be obtained from a source in the system other than the pump 4, e.g. from the accumulator 20. It is furthermore perceived that one is not limited in any way to using just one lifting cylinder but that also two or more lifting cylinders can be used in a circuit according to the invention. The same is naturally true also of the number of accumulators, which can be varied as desired or needed. It is also perceived that a number of modifications can be made with regard to the valve arrangements without it affecting the principles of the invention. Furthermore, it is perceived that many other types of turning devices can be used in the actual slewing circuit instead of a hydraulic motor 5 to achieve rotation of the swivellably arranged part, for example by means of a rack interacting with a spur ring on the slewing part, or a hydraulic cylinder. Furthermore, it is perceived that multiples of the constituent elements can be used, for example a plurality of lifting cylinders and/or a plurality of hydraulic motors 5, etc.

Furthermore, it is perceived that the invention can also be used in similar handling machines other than those previously named, for example forestry machines, so-called croppers etc.

The invention can also be utilized in connection with the use of a control valve via which the hydraulic oil is routed to and from the accumulator or lifting cylinder. Here it holds good that the potential energy which is in the lifting piston will in the event of a lowering movement be returned to the accumulator via the control valve, which accumulator in turn is connected to the variable reciprocating pump. A precondition however is that the accumulator pressure is below the lifting cylinder pressure and that before a state of equilibrium arises a separate return line to the tank is opened. In a lifting movement, the pressurized oil in the accumulator will provide the pressure increase or pressure drop in the reciprocating pump necessary for the requirement to execute the desired work. If for example the lifting work calls for 200 bar and the accumulator pressure is 100 bar, the stored energy has executed half the lifting work. It is preferably the case that the control valve is supplied with hydraulic medium from the lifting pistons via regular pump inlet and that the control valve is provided with pressure compensation which on activation of the valve emits a pressure-compensated flow to the motor port.

To modify the invention for fork lift trucks, which are characterized by a form of working in which it was not possible using the previous technology to recover the lowering load energy, the following applies. The normal cycle for a fork lift truck is to lift or lower a load, it not being possible to determine the sequence for these operations, but rather the task controlling the course of events. Due to the design of the lifting cylinder, as much oil is used to lift the forks empty or with a full load, only the pressure varies. The hydraulic system for a fork lift truck with energy recovery should therefore be completed by a valve which in the event of a low lowering load automatically opens a valve which is connected to the tank when $\Delta$ p between the cylinder pressure and accumulator falls below a predetermined value. In this regard a valve actuated by the operator is naturally conceivable.

What is claimed is:

1. Mobile handling device with hydraulic circuit, which hydraulic circuit (L) comprises a lifting cylinder (1) arranged in a lifting device (100) suitable for handling a variable load and a first accumulator (6) for recovering or recycling lowering load energy, wherein the hydraulic circuit also comprises a variable hydraulic machine (3) with two ports (10, 11), which hydraulic machine is capable via a drive unit (D) of emitting full system pressure in two flow directions to said ports, one port (11) being connected to said first accumulator (6) and the other port being connected to said lifting cylinder (1), characterized in that communicating with said hydraulic circuit (L) is a control value (13), said variable hydraulic machine (3) being connected to at least one of said first accumulator (6) and said lifting cylinder (1) without the connection going via the control valve (13), in that the hydraulic circuit (L) comprises a second accumulator (20), which is connected via at least one nonreturn valve (31) to at least one of the lines between the first accumulator (6) and hydraulic machine (3) or hydraulic machine (3) and lifting cylinder (1), and in that said second accumulator (20) is connected via said at least one nonreturn valve (31-32, 31-30) to both the connection between the first accumulator (6) and the machine (3) and the connection between the machine (3) and the lifting cylinder (1).

2. Mobile handling device according to claim 1, characterized in that neither said connection between said accumulator and said hydraulic machine nor said connection between said lifting cylinder and said hydraulic machine go through said control valve (13).

3. Mobile handling device with hydraulic circuit according to claim 2, characterized in that the hydraulic circuit (L) comprises a first stop valve (2) arranged in the line between one port (10) of the hydraulic motor and the lifting cylinder (1), and a second stop valve (5) arranged in the line between the hydraulic motor's second port (11) and the first accumulator (6).

4. Mobile handling device with hydraulic circuit according to claim 3, characterized in that said first (2) and second (5) stop valves are controlled by a servo circuit (4, 9) which comprises a servo pump (4) and a valve unit (9) by means of which the stop valves (2, 5) are actuated to the open position when a control signal activates the changeover valve (9) to open the connection between the first accumulator (6) and lifting cylinder via the hydraulic machine (3).

5. Mobile handling device with hydraulic circuit according to claim 2, characterized in that said lifting cylinder (1) is of the double-acting type comprising a rod side (1A) and a cylinder side (1B), the side (1A) which is not directly connected to the hydraulic machine (3) being able to obtain oil from a hydraulic pump (12) via a control regulator (13).

6. Mobile handling device with hydraulic circuit according to claim 1, characterized in that disposed in direct connection to the lifting cylinder (1) is a pressure monitoring element (17).

7. Mobile handling device with hydraulic circuit according to claim 1, characterized in that the system pressure in said second accumulator (20) is considerably lower than in said first accumulator (6).

8. Mobile handling device with hydraulic circuit according to claim 1, characterized in that the hydraulic circuit (L) communicates with a second hydraulic circuit (S) for a slewing turning device (5), which second circuit (S) comprises valve elements (36, 37) which in connection with deceleration of said slewing part supplies hydraulic fluid to said first accumulator (6), this being filled and at the same time acting on the slewing part with a decelerating force.

9. Mobile handling device with hydraulic circuit according to claim 8, characterized in that said valve elements (36, 37) consist of sequential valves.

10. Mobile handling device with hydraulic circuit according to claim 8, characterized in that a nonreturn valve (38) is disposed in the line between said valve elements (36, 37) and said first accumulator (6).

11. Mobile handling device with hydraulic circuit according to claim 9, characterized in that said sequential valves (36, 37) are proportionally controlled so that the deceleration speed is determined by the pressure level of the sequential valves (36, 37).

12. Mobile handling device with hydraulic circuit according to claim 9, characterized in that said valve element's drainage lines (43, 48) are connected to a control valve's servo covers for the slewing movement so that the sequential valves (36, 37) receive a control pressure which is influenced by the pressure in the slewing circuit.

* * * * *